Patented Mar. 20, 1945

2,371,899

UNITED STATES PATENT OFFICE 2,371,899

CHLORINATED RUBBER EMULSION

Julius G. Little, Wilmington, Del., assignor to Hercules Powder Company, Wilmington, Del., a corporation of Delaware No Drawing. Application March 29, 1941, Serial No. 385,860

7 Claims. (Cl. 260—737)

This invention relates to aqueous emulsions of mixtures of chlorinated rubber and a glycol ester of a rosin acid.

The glycerol ester of rosin, usually referred to as ester gum, has assumed great importance in many industrial fields. The glycol esters of rosin, however, although they have been described in the literature, have achieved practically no commercial utilization. The glycol esters of rosin are generally softer and lower melting that the glycerol esters and consequently are not adapted to many of the ester gum uses.

I have found that glycol esters of rosin act both as a plasticizer and as a resin in conjunction with chlorinated rubber and thereby provide compositions which are quite unique and which are highly valuable.

It is, therefore, an object of this invention to provide aqueous emulsions containing as essential constituents, chlorinated rubber and a glycol ester of a rosin acid.

It is a further object of this invention to provide aqueous emulsions which on application to a surface and after evaporation of the solvent, will leave deposited on such surface the unique, combined mixture comprising essentially chlorinated rubber in combination with a glycol ester of a rosin acid.

Now, in accordance with this invention, the above objects are accomplished by emulsifying a solution of chlorinated rubber and a glycol ester of a rosin acid in water by means of a suitable emulsifying agent.

The glycol esters of a rosin acid which may be utilized in preparing the novel compositions of this invention are characterized by complete thermoplasticity and high flexibility. They are essentially water-insoluble and have melting points varying in the range of about 25° C. to about 70° C., depending on the particular glycol or mixture of glycols used in the esterification.

The rosin acid useful in preparing compositions of this invention may be in the form of purified rosin acids or may be in the form of the rosin itself. Either wood rosin or gum rosin such as American or French gum rosin may be used. The acids derived from such rosins, for example, abietic acid, pimaric acid, sapinic acid, etc., are all contemplated. The rosin or rosin acid may also be hydrogenated before esterification with the glycol.

The glycols which may be employed in preparing useful rosin esters may be any one or a mixture of, for example, ethylene glycol, propylene glycol, diethylene glycol, triethylene glycol, tetraethylene glycol, hexaethylene glycol, nonaethylene glycol, decamethylene glycl, butylene glycol, dipropylene glycol, etc., or mixtures thereof, etc. The glycol esters of the rosin acids or rosins may be prepared by procedures well-known in the art. The diethylene glycol ester, for example, may be prepared by heating together approximately equivalent proportions of rosin and diethylene glycol in accordance with the process of U. S. Patent 1,779,710 to George M. Norman. By a preferable method of preparation, 231 parts by weight of N-wood rosin and 42 parts by weight of diethylene glycol may be heated at a temperature gradually increased from 200 up to 285° C. in a 6–7 hour period and the heating maintained at that point for an additional 7–8 hours. The resulting ester will have an acid number of about 6–8, a melting point (Hercules drop method) of about 48 to 51° C. and will be pale in color. An esterification catalyst such as, for example, boric acid, zinc, etc., may be used to accelerate the esterification. The reaction is preferably carried out in an inert atmosphere. In a similar manner, the ethylene glycol ester of rosin may be prepared by heating approximately equivalent proportions of rosin and ethylene glycol gradually to a temperature of about 250° C. in a period of about 3 hours, and maintaining the heating at that temperature until the desired acid number is reached. By heating at 250° C. for about 5 hours, for example, the ester will have an acid number of about 33 and a melting point (Hercules drop method) of about 69° C.

The propylene glycol ester of rosin may be prepared in a similar manner or at a slightly higher temperature. Thus, for example, N-wood rosin may be heated with an amount of propylene glycol equivalent to about 30% excess of the equivalent amount at a temperature raised gradually from 220° up to about 270° C., and held at that point until the desired acid number is obtained. The propylene glycol ester will have a melting point of about 65° C.

By using hydrogenated rosins or rosin acids, in preparing the glycol esters, esters resembling those from the untreated rosins in most properties are obtained. Generally speaking, the esters of hydrogenated rosin will be slightly lower melting. They will also be more light-resistant.

The chlorinated rubber which is useful in providing the novel compositions in accordance with this invention may be prepared by any of the known procedures and will comprise the products containing from about 60% to about 68% of combined chlorine. Any of the usual viscosity types may be utilized such as those having viscosities up to about 7000 centipoises. As solvents for the chlorinated rubber and glycol ester of rosin any of the well-known water-immiscible solvents for these materials may be employed, as for example, coal tar hydrocarbons such as benzene, toluene, xylene; petroleum hydrocarbons such as Stoddard solvent, Solvesso No. 2 and No. 3, butanol, etc., or mixtures thereof. By Stoddard solvent and the Solvesso solvents are meant the petroleum hydrocarbons known in the industry as such and generally characterized as follows:

|  | Boiling range | Specific gravity |
|---|---|---|
|  | °C. |  |
| Stoddard solvent | 152–195 | 0.767 |
| Solvesso No. 2 | 135–177 | 0.858 |
| Solvesso No. 3 | 175–210 | 0.884 |

Suitable emulsifying agents for use in preparing the emulsions are, for example, the alkali metal salts of the higher aliphatic half ester sulfates, as sodium lauryl sulfate, sodium stearyl sulfate; sulfonated oils, as sulfonated castor oil, sulfonated olive oil, etc.; soaps, as sodium stearate, sodium oleate, potassium oleate; sulfonic acids, as sodium butyl naphthalene sulfonate, sodium isopropyl naphthalene sulfonate, etc.

The proportion of the glycol ester of a rosin acid to be used with the chlorinated rubber will depend generally on the particular type of composition desired and the particular glycol used in preparing the ester. Generally speaking, the glycol ester of a rosin acid will be present in an amount within the range of about 20% to about 80% by weight based on the weight of the chlorinated rubber, and preferably within the range of about 33% to about 67% by weight based on the weight of chlorinated rubber.

Where desirable other materials such as waxes, oils, pigments, fillers, etc. may be included in the emulsions. An additional plasticizer may also be employed where a particular effect may be desired. Such additional ingredients may desirably be dissolved in the solvent before emulsification.

The aqueous emulsions produced in accordance with this invention are highly useful for a large variety of purposes. Thus, they may be combined with pigments or dyes to provide printing pastes for printing textiles. With pigments or dyes, the combination of the chlorinated rubber and the glycol ester of rosin exerts a superior binding action on the pigment or color and thereby provides a print which exhibits excellent resistance to washing, crocking and dusting out. In the surface coating of paper, cellulose foils, metal, glass, wood, cloth, leather, etc., the emulsions may be used to impart highly desired effects. The emulsions may also be used directly in the finishing or sizing of textile fabrics, yarns, etc., where they provide softer finishes with good flexibility and high resistance to laundering. The emulsions also exert a desirable binding action on other finishing agents.

As illustrative of the various aqueous emulsions which may be prepared in accordance with this invention, the following examples are typical:

*Example I*

A solution of 125 parts by weight of chlorinated rubber and 125 parts by weight of the diethylene glycol ester of hydrogenated wood rosin was prepared in 250 parts by weight of a 1:1 mixture of toluene and xylene. The solution obtained was emulsified by addition to 250 parts by weight of water containing 5 parts by weight of sodium oleate. The emulsion was then homogenized by two passes through a Premier colloid mill. The finished emulsion had a solids content of 33.8% by weight.

*Example II*

A similar emulsion was prepared according to the procedure of Example I but utilizing a solution of 125 parts of chlorinated rubber and 40 parts of the diethylene glycol ester of hydrogenated wood rosin in a solvent composed of 125 parts by weight of toluene and 115 parts by weight of xylene. The emulsion was prepared by dispersing the above solution in a solution of 5 parts by weight of sodium oleate in 200 parts by weight of water. An emulsion having a solids content of 27.8% by weight resulted.

*Example III*

The emulsion of Example I was duplicated with use of the diethylene glycol ester of N wood rosin in place of the hydrogenated rosin ester. A similar emulsion resulted.

The emulsions prepared according to the above examples were used in the preparation of printing pastes having highly advantageous properties in the printing of textile fabrics. As illustrative of such an application of the emulsions the printing pastes listed below in Table I were prepared.

*Table I*

|  | Sample No. | | | | | |
|---|---|---|---|---|---|---|
|  | 1 | 2 | 3 | 4 | 5 | 6 |
|  | Parts by weight | Parts by weight | Parts by weight | Parts by weight | Parts by weight | Parts by weight |
| Emulsion of Example I | 50 |  |  | 50 |  |  |
| Emulsion of Example II |  | 50 |  |  | 50 |  |
| Emulsion of Example III |  |  | 50 |  |  | 50 |
| TiO₂-barium sulphate pigment | 20 | 20 | 20 | 20 | 20 | 20 |
| Blue pulp color (50% in water) |  |  |  | 4 | 4 | 4 |

The printing pastes were prepared according to the formulae listed above in Table I by adding the pigment to the emulsion with stirring. The emulsion reversed in each case and the viscosity showed an appreciable rise. The pastes were all of satisfactory consistency for printing fabrics from intaglio rolls.

Each of the printing pastes shown in Table I were printed on cloth, the cloth then air dried for 24 hours and subsequently dried at 100° C. for 5 minutes. The cloth was dampened and ironed dry in about 2 minutes at a temperature of about 275 to 300° F. The prints obtained were stiff and crisp and were highly desirable where a print having such properties is desired, such as in printing of canvas, awning cloth, etc.

Other uses of the aqueous emulsions produced in accordance with this invention will be readily apparent.

It will be understood that the details and specific examples are illustrative only and the invention as herein broadly described and claimed is in no way limited thereby.

This application forms a continuation-in-part of my application, Serial No. 285,959, filed July 22, 1939, entitled "Composition of matter."

What I claim and desire to protect by Letters Patent is:

1. An aqueous emulsion comprising a solution of chlorinated rubber and a glycol ester of a rosin acid having only glycol and rosin acid as reacted components of the ester and having a melting point within the range of about 25° C. to about 70° C. in a water-immiscible solvent therefor emulsified in water containing an emulsifying agent.

2. An aqueous emulsion comprising a solution of chlorinated rubber and from about 20 to about 80 per cent by weight based on the weight of chlorinated rubber of a glycol ester of a rosin acid having only glycol and rosin acid as reacted components of the ester and having a melting point within the range of about 25° C. to about 70° C. in a water-immiscible solvent therefor, said solution being emulsified in water containing an emulsifying agent.

3. An aqueous emulsion comprising a solution of chlorinated rubber and from about 20 to about 80 per cent by weight based on the weight of chlorinated rubber of a diethylene glycol ester of a rosin acid having only glycol and rosin acid as reacted components of the ester and in a water-immiscible solvent therefor, said solution being emulsified in water containing an emulsifying agent.

4. An aqueous emulsion comprising a solution of chlorinated rubber and from about 33 to about 67 per cent by weight based on the weight of chlorinated rubber of a glycol ester of a rosin acid having only glycol and rosin acid as reacted components of the ester and having a melting point within the range of about 25° C. to about 70° C. in a water-immiscible solvent therefor, said solution being emulsified in water containing an emulsifying agent.

5. An aqueous emulsion comprising a solution of chlorinated rubber and from about 20 to about 80 per cent by weight based on the weight of chlorinated rubber of a diethylene glycol ester of hydrogenated rosin having only the said glycol and the said rosin as reacted components of the ester and in a water-immiscible solvent therefor, said solution being emulsified in water containing an emulsifying agent.

6. An aqueous emulsion comprising a solution of chlorinated rubber and from about 20 to about 80 per cent by weight based on the weight of chlorinated rubber of a diethylene glycol ester of wood rosin having only the said glycol and the said rosin as reacted components of the ester and in a water-immiscible solvent therefor, said solution being emulsified in water containing an emulsifying agent.

7. An aqueous emulsion comprising a solution of chlorinated rubber and from about 20 to about 80 per cent by weight based on the weight of chlorinated rubber of a diethylene glycol ester of gum rosin having only the said glycol and the said rosin as reacted components of the ester and in a water-immiscible solvent therefor, said solution being emulsified in water containing an emulsifying agent.

JULIUS G. LITTLE.